April 17, 1934.
T. VARNEY
1,954,900
METHOD OF ELECTRICAL REDUCTION OF METALLIC ORES
Filed Oct. 11, 1933
2 Sheets-Sheet 1
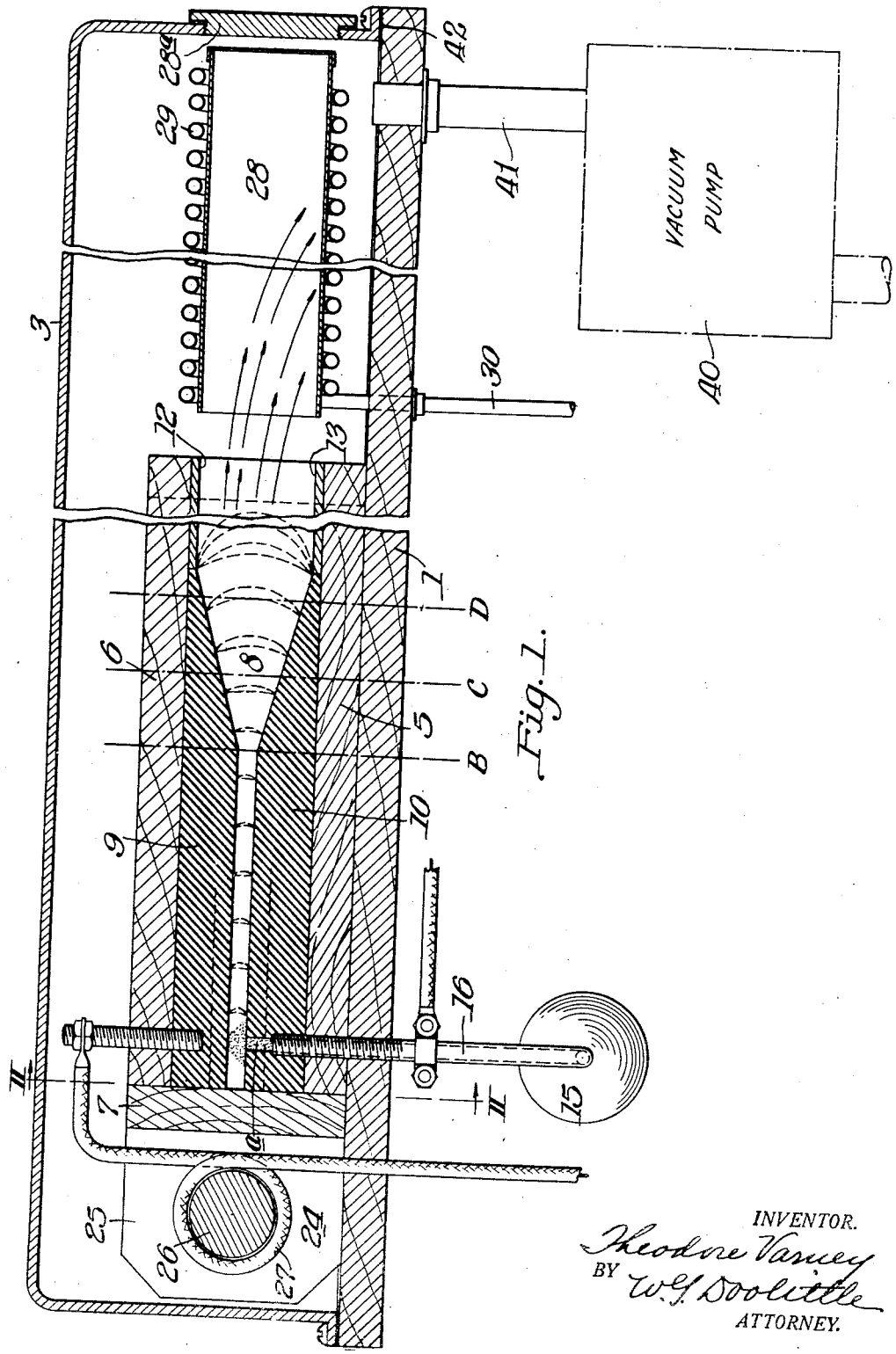
INVENTOR.
Theodore Varney
BY W. J. Doolittle
ATTORNEY.

April 17, 1934.  T. VARNEY  1,954,900
METHOD OF ELECTRICAL REDUCTION OF METALLIC ORES
Filed Oct. 11, 1933  2 Sheets-Sheet 2
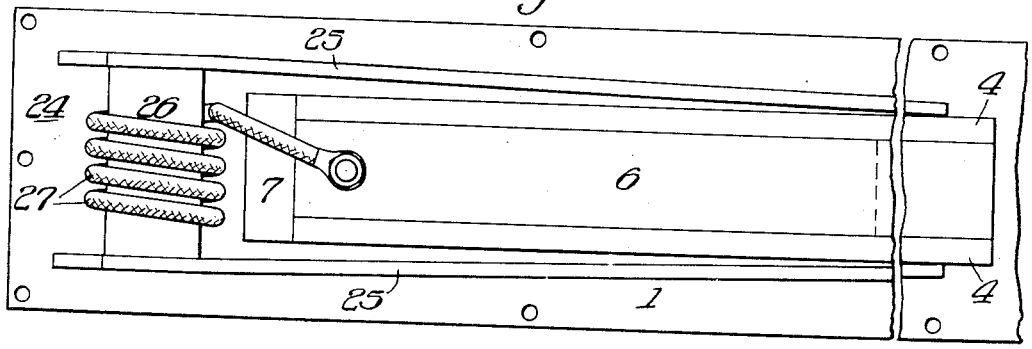
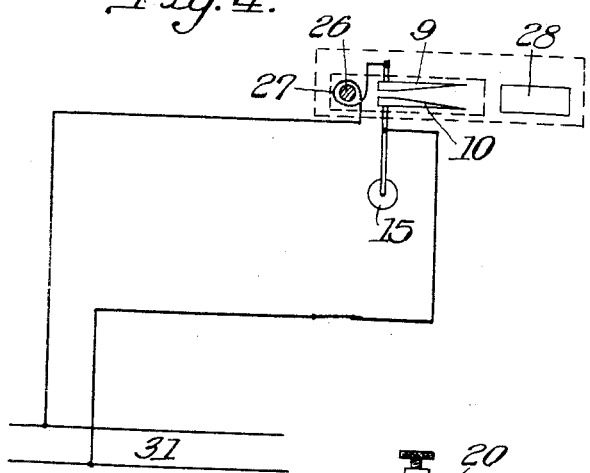
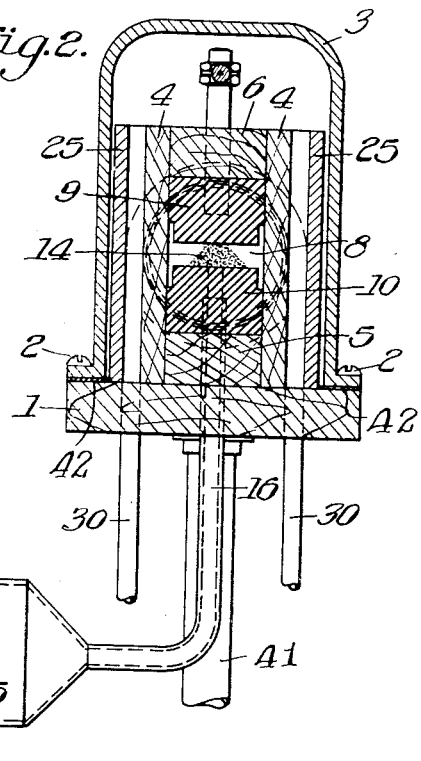
INVENTOR.
Theodore Varney
BY W. S. Doolittle
ATTORNEY.

Patented Apr. 17, 1934

1,954,900

UNITED STATES PATENT OFFICE 1,954,900

METHOD OF ELECTRICAL REDUCTION OF METALLIC ORES

Theodore Varney, New York, N. Y.

Application October 11, 1933, Serial No. 693,080

9 Claims. (Cl. 75—22.5)

This invention relates to the art of dissociation and segregation of the constituent elements of metallic ores, mixtures, compounds, and the like, and is a continuation in part of an application filed by me February 12, 1932, Serial No. 592,611.

More specifically, it relates to the electric reduction of metals from their respective ores or compounds and the isolation of the metallic elements from other elements and from each other until they have reached a chemically stable state.

The usual commercial methods heretofore followed in the treatment of ores, etc. for the reduction and isolation of the elements thereof comprises what may be termed the thermal methods, including heating the ore in contact with certain compounds or fluxes which contain one or more elements having a strong chemical affinity for the substance normally combined with the metal in the ore. Under these methods, when the temperature of reaction is reached, the ore breaks up and the non-metallic portion forms new compounds with the elements present in the flux leaving the metal in an approximately pure state, which, upon cooling the metal, remains isolated.

The other method followed is the electrolytic process. Under the first method, many stable ores cannot be commercially reduced and under the second method, due to the elaborate refining treatment of the ore prior to the final electrolytic reduction and the characteristics of the electrolytic bath, the cost thereof is so high as, in many cases, to be prohibitive.

It is a prime object of my invention to provide a method for cheap commercial reduction of metallic ores, mixtures and compounds, which may be readily employed for the dissociation and segregation of the metallic constituents of the more common ores, as well as the said stable ores and compounds. My new and improved method also has particular application to the refining of impure metals and alloys.

My invention contemplates the heating and ionizing of the particles of an ore, mixture or compounds by passing an electric current therethrough, whereby the said particles are dissociated and assume a vapor state, then applying a magnetic field thereto, transversely to the direction of the electric current, to accelerate the particles of said vapor in a direction transverse to both electric current and magnetic field, and then collecting the said particles on a surface at low temperature in segregated relation.

My invention further contemplates a quick conversion or dissociation of each material charge to vapor form and the rapid removal of vapors from between the electrodes and the interruption of the flow of current therebetween and the subsequent reestablishment of the flow. By the interruption of the flow of current, I provide what may be termed a momentary arc, as distinguished from a permanent arc, and by so doing, an extremely high temperature may be employed on the material being treated for so brief a time that no destruction or harm is caused to parts of the apparatus. The action of the arc on the material is like an explosion or flash.

In the practice of my method, I utilize the knowledge that the atoms of an element each contain a certain number of loosely bound electrons which become detached from the atom by the influence of the neighboring atoms and are free to move more or less at random. These motions are governed to some extent by temperature, but they are not all alike in velocity or direction. The free electrons jostle about against each other, but when an electric field is applied they are all, on the average, impelled to drift with the fall of potential of the field, thus producing an electric current flow.

In conducting solids, the free electrons jostle about more violently when the temperature is raised, so that more work must be done by the electric field to impel them in a common direction. This explains the increase in resistance which occurs in most metals with a rise in temperature.

In non-conducting solids or insulators, there are, at normal temperatures, comparatively few free electrons in the atoms. However, as the material is heated, the amplitude of the vibrations of the electrons increase and they finally become detached from their respective atoms and are then free to travel under the influence of an applied electric field. At high temperatures, such materials become conductors. Refractory metallic oxides belong to this class of materials.

In the case of a gas, the distance between molecules is so great that an exchange of electrons cannot take place as in solids. There are, however, always present in gases a few free electrons and ions. An ion is formed by the addition or subtraction of an electron from a neutral atom or molecule; a positive ion is formed by the subtraction of an electron, and a negative ion by the addition of an electron.

A neutral particle of a gas becomes ionized if a free electron moving with sufficient velocity hits it and detaches one of its electrons. In order to accomplish this, the moving electron must have a certain amount of energy. For each known element, there is one particular outstanding value for this energy, which is called the minimum ionizing potential. It is represented by the fall of potential of an electric field acting upon the free electron, necessary to impart to the electron a velocity sufficient to knock off from the neutral gas particle its outermost or most loosely attached electron.

The minimum ionizing potential of an element is a definite periodic function of the atomic number of that element. A chart showing the ionizing potentials of the elements, plotted with reference to their respective atomic numbers, resembles very closely the familiar periodic tables known to chemists for many years and which disclose the fixed relation between the atomic number on the one hand and the atomic volume, melting-point and compressibility on the other hand.

The flow of current through a gas subjected to an electric potential is accomplished by the free moving electrons, but to a much greater extent by the streams of ionized gas particles resulting from the impacts of the free electrons against them.

The higher the temperature of the gas, or the lower the pressure, the greater will be the proportion of ionization and, consequently, the greater the current flow for any given potential. For a mixture of different gaseous elements all at the same temperature and pressure and subjected to the same electric potential, the gas having the lowest ionizing potential will be most strongly ionized and will, therefore, carry the largest proportion of the total current flow.

If a mixture of ionized gases through which a current is flowing be subjected to the action of a magnetic field, the direction of which is at right angles to the current flow, a mechanical force will be exerted upon the filament of each gas proportional to the product of the intensity of the magnetic field and the current flowing in that particular gas filament. The direction of this force will be at right angles to both that of the current and the magnetic field.

These forces will move the filaments of the various gases all in the same direction, but with various values of acceleration. The acceleration will be directly proportional to the force acting upon the filament and inversely proportional to its mass.

If an electric arc be drawn between two electrodes, the total voltage drop between them is made up of three parts; the cathode drop close to the negative electrode, the anode drop near the positive electrode and the arc column drop between the other two. The cathode and anode drops are constants depending upon the material of the electrodes and the length of the arc. The cathode drop is practically equal to the minimum ionizing potential of the electrode. The relations between voltage, current and arc length are given by the expression $V = A + B/i^n$ where V is the total voltage across the arc, between electrodes; A is the sum of the cathode and anode drops; B is a constant depending upon the electrode material and the arc length; $i$ is the current and $n = 2.62 (10)^{-4} T$ where T is the absolute boiling temperature of the electrode material. For a pair of copper electrodes in air, for illustration, $T = 2580$, $n = .67$, min. ionizing pot. of copper $= 7.7$.

| Arc length | $i$ | A | B/$i^n$ | V |
|---|---|---|---|---|
| 3 millimeters | 1 | 29.0 | 39.2 | 68.2 |
| 3 millimeters | 10 | 29.0 | 8.8 | 37.8 |
| 10 millimeters | 1 | 33.3 | 70.5 | 111.5 |
| 10 millimeters | 10 | 33.3 | 15.0 | 56.0 |

If the total voltage is held constant while the arc length increases, the term $B/i^n$ increases and the arc current ceases when the minimum ionizing potential of the material forming the arc vapor predominates.

Referring to Fig. 1 of the accompanying specification, electrodes 9 and 10 of refractory conducting material such as graphite, are spaced a short distance apart, insulated and closed in on the sides and left end. If a wire of a single metallic element whose minimum ionizing potential is of a certain value be placed between the electrodes at the charging inlet 16 and sufficient voltage be applied between the electrodes to quickly and completely vaporize the wire, the hot vapors would be electrically conducting and if the arc space was not too great for the applied voltage the arc would hold between the electrodes and they would begin to be consumed, feeding the arc from their own vapor after the wire vapor had blown away. However, the sudden vaporization of the wire creates a pressure in the arc space, causing the vapors to expand rapidly toward the right along the parallel portion of the arc space. The pressure gradient decreases toward the right and the gases expand until the pressure is equalized with the surrounding medium.

The arc current flows across between the electrodes throughout the entire cross section in contact with the hot vapors. As the gases reach a pressure equilibrium the arc would begin to consume the electrodes, except for the magnetic field which is applied normal to the direction of the arc current and in such a direction as to force the vapors toward the right. As the expanding vapors reach the end of the parallel portion of the arc space marked B, their pressure will have fallen sufficiently so that the force of the magnetic field will be relatively large. The current will cease when the vapor reaches some point as C in the diverging portion of the arc passage.

The arc current will continue to flow in the vapor to the left of C and eventually all the vapor will be scavenged from the arc space. The vapors will drift onward due to their momentum and will come to rest on the floor of the condensing chamber described in the specification. The latter is maintained at a constant temperature throughout its length below the point of condensation of the vapor. Since all the vapors leave the point B at the same definite velocity, they will all come to rest in a definite zone on the condenser floor under the combined action of gravity and their momentum.

The passage of the vapors over the electrodes is so rapid that the latter are not consumed and the arc vapors partake only of the characteristics of the vaporized wire.

If a wire of a different element be vaporized the arc current will cease at some other point, as at D and its condensed vapor will come to rest at a different point upon the condenser floor.

If any combination of elements be simultaneously vaporized, the action of each elementary vapor will be different from the others and each will be deposited upon a separate zone on the condenser floor.

The distance $s$, from the point B to C, D, etc. varies in opposite ratio to the minimum ionizing potential, P, of the element in question. Thus: $s$ varies as $$\frac{1}{P}.$$

The force F, due to the combined action of the current flowing in the elementary vapor filament and the magnetic field produces upon each particle or atom of the filament an acceleration $a$, which varies with the force and opposite to the mass which in turn is proportional to its atomic weight A. Thus: $a$ varies as $$\frac{F}{A}.$$

Between B and C, D, etc. the current varies from a maximum to zero so that the mean acceleration varies as $$\frac{F}{2A}.$$

The time $t$ required for each elementary particle to travel from B to C, D, etc. varies with the square root of the distance and opposite to the square root of the acceleration. Thus: $t$ varies as $$\sqrt{\frac{s}{a}} \text{ or } t = \sqrt{\frac{2s}{a}}.$$

At the end of time $t$ each elementary particle will be traveling with a velocity $v$, proportional to the product of the time and the mean acceleration. Thus; $v$ varies as $at$ or $v=at$.

When the current has ceased in the last elementary vapor in point of time the various vapors will have traveled different distances from B and will drift on into the condensing chamber with their same relative positions.

After a certain number of repetitions of the cycle, the condensing chamber is opened and the liner with the various elements condensed in separate zones upon it is removed. In practice, the liner is preferably made of the same material as the principal element being recovered, and it can be thus cut apart and the desired portions melted into ingots, while the rejected portions can be put through the process again.

Since the electric arc can melt, vaporize, dissociate and ionize any known substance, it is only necessary to subject the material to be reduced to a current flow, heavy enough to accomplish this purpose. Since at the high temperature of the arc, radiation losses are large and damage to the furnace would result in time, the current flow must be so large and so concentrated upon the material to be reduced as to accomplish its complete vaporization in an extremely short time. The movement of the gases with the consequent cessation of current flow then follow so rapidly that radiation losses are small and the efficiency of my process is high.

The process is intermittent, and by properly timing the introduction of new material to be reduced, the temperature of the furnace itself may be held within safe limits. Water-cooling of the furnace parts may be also resorted to, if necessary.

From the above described steps, and since no two elements have the same minimum ionizing potential, it is apparent that my method is applicable to the reduction of any known metals. Granulated carbon placed between two electrodes, preferably of graphite, can be heated and vaporized by the simple flow of current through it, and since the cold granulated carbon is electrically conducting, a comparatively low potential is sufficient for the purpose. It is merely necessary to mix with the carbon a quantity of the ground material to be reduced, to vaporize the latter, and as the latter becomes ionized the electrical resistance of the entire mass reduces, thereby greatly increasing the current flow in an extremely short time, provided only that the potential on the electrodes is substantially maintained.

The electrical resistance of hard pressed graphite electrode material is approximately 0.00033 ohms per inch cube. Finely ground carbon, loosely packed, has a resistance from about 0.195 to about 0.059 ohms per inch cube, depending upon the amount of packing resulting from jarring. A mixture of ground carbon and non-conducting refractory ore, such as bauxite, magnesite, silica, lime, etc., where the ore represents approximately two-thirds of the total weight, has a resistance of about 0.180 ohms per inch cube after the materials are properly mixed and subjected to a slight pressure. One cubic inch of such a mixture weighs about 0.033 pounds, and its specific heat varies from about 0.125 to about 0.460 at 1000 degrees centigrade. To heat the mixture up to the temperature of reaction (3500 degrees F.) would require $.033 \times .460 \times 3500 = 53$ British thermal units, or 0.0155 kilowatt hours, or 57,000 watt seconds.

If one inch cube of such a mixture be placed between a pair of electrodes and subjected to a potential of 500 volts, the current flow through the cold charge would be $500/.180$, or 2777 amperes. The initial energy would be 1,387,500 watts, and the time required to vaporize the charge would be .041 seconds. Actually, it would be less than this, because of the rapid current rise in the charge as it heats.

While my process is generally applicable to all compounds, the following application serves to illustrate the operation. Assume a charge consisting of a mixture of bauxite and carbon. The elements present would be carbon, oxygen, aluminum, silicon, possibly some titanium and some iron.

|   | Oxygen | Carbon | Silicon | Iron | Titanium | Aluminum |
|---|---|---|---|---|---|---|
| P | 13.0 | 10.0 | 8.5 | 7.4 | 6.5 | 6.0 |
| A | 16.0 | 12.0 | 28.0 | 56.0 | 48.0 | 27.0 |
| s | 1/13 | 1/10 | 1/8.5 | 1/7.4 | 1/6.5 | 1/6 |
|   | .077 | .100 | .118 | .135 | .154 | .167 |
| a | 1/16 | 1/12 | 1/28 | 1/56 | 1/48 | 1/27 |
|   | .0625 | .0835 | .0358 | .0178 | .0208 | .0370 |
| t | 1.57 | 1.55 | 2.57 | 3.90 | 3.85 | 3.00 |
| v | .098 | .135 | .092 | .0695 | .0800 | .111 |
| d | .305 | .417 | .240 | .135 | .158 | .2669 |
| Values of $d$ compared to iron | 2.25 | 3.00 | 1.78 | 1.00 | 1.17 | 1.98 |

P=minimum ionizing potential
A=atomic weight
s=distance from B to C, D, etc. proportional to 1/P
a=mean acceleration from B to C, D, etc. proportional to 1/A
t=time from B to C, D, etc.=$\sqrt{2s/a}$
v=velocity at C, D. etc.=$at$
d=distance from B to each filament when current ceases in last filament to reach its deionizing point proportional to $s+v$ $(3.9-t)$ The detail steps and operation of my method may be more readily understood from the following description taken in connection with the acompanying drawings, wherein:

Fig. 1 is a vertical longitudinal sectional view of a furnace that may be employed in the practice of my method;

Fig. 2, a part end view and a part sectional view, taken on line II—II of Fig. 1;

Fig. 3, a top plan view, with the casing or a portion thereof removed; and

Fig. 4, a diagrammatic view of the apparatus shown in connection with an electric current.

Referring to the drawings, the furnace illustrated includes a base or foundation 1 formed of some suitable insulating material, as dry wood, and mounted on and detachably secured to the base by bolts 2 is a casing or cover 3, preferably formed of non-magnetic metal. Disposed on the base and extending longitudinally thereof, are spaced-apart parallel members 4 made of heat-resisting insulating material, such as pressed asbestos board.

These members in connection with a bottom member 5, a top member 6, and an end member 7, all formed from some suitable insulating material, are adapted and assembled to provide an elongated ore reduction chamber 8, in which are located a pair of electrodes 9 and 10.

Extending respectively from the forward ends of each of the electrodes 9 and 10, towards the outer end of chamber 8, is an insulator filler piece 12 and 13, made of heat resisting material, such as pressed asbestos board. Electrodes 9 and 10, formed, for example, of hard pressed graphite or carbon, are of tapered formation at the right end so that when assembled, as shown by Fig. 1, they will give first a straight passageway and then a tapering or a gradually increasing width to that portion of the chamber 8 located therebetween, in order to produce a final diverging passageway for the vapors of the charge.

As illustrated, the charge 14 is fed between the electrodes from an associated air tight hopper 15, through a hollow lower electrode stud connection 16 and a passage $a$ in electrode 10, by a feed screw mechanism 17 operated by a shaft 19, the latter being actuated by any suitable means, not shown. The metallic ore, mixture, or compound to be reduced is supplied in ground or granular form through an opening in the hopper, closed by a closure means 20.

24 designates an electro-magnet having convergent pole pieces 25 extending from a soft iron core 26, along and on the outside of the side walls 4, and terminating at points beyond the outer ends of the electrodes 9 and 10. Several turns 27, of an electric cable, are wound on the core 26, and function as a blow-out coil for the arc by setting up a strong magnetic field between the pole pieces 25 in the gap between the electrodes, this field being in phase and having a direction at right angles to the direction of the electric field of the arc.

The convergent pole pieces of the magnet, it will be understood, will give an increasing intensity to the magnetic field, which is adjustable with respect to the length of the electrodes, preferably by increasing with the direction of motion of the charge.

The crescent markings between the electrodes in Fig. 1 show the relative position of the arc up to the outer ends of the electrodes and the arc just prior to being blown out between the insulating members 12 and 13; the lines of travel from this point on into the condensing chamber being indicated by the curved lines.

Spaced from and in line with the reduction chamber 8, I provide a removable condensing chamber or receptacle 28 for receiving the treated charges after their passage through the elongated chamber 8. Receptacle 28 is preferably made of the same material as that being reduced, is removable through an opening having a closure member 28a, and is kept at the desired temperature by the passage of a cooling fluid through coils 29 having an inlet and outlet connections 30.

The furnace just described is connected through its terminals to the pair of mains 31, source of adjustable constant potential, A. C. or D. C.

A high vacuum may be maintained in the reduction chamber to assist the operation of the furnace by the provision of an exhaust pump connected to the chamber. Said pump also serves to remove the gaseous products of reaction.

The process may be stated to include a continuous repetition of a cycle of events. A cycle would be substantially as follows:

The arc gap between the electrodes is bridged by a charge having some electrical conductivity when cold. An electric potential is applied to the electrodes of sufficient strength to quickly heat the charge. As the temperature of the charge increases, its electrical resistance decreases and the current rise is extremely rapid, thus vaporizing the entire charge in an extremely short time. At the same time as the current is established the series coil of the magnet establishes a magnetic field in phase across the arc gap. By reason of the elongated character of the electrodes, the arc does not cease for an appreciable time, thus permitting the current to rise and completely vaporize the charge. As the gases of the charge move along the diverging part of the electrodes, the arc increases in length so that the electric potential gradient across the arc decreases gradually, thus stopping the current flow successively in the different gaseous elements in opposite ratio to their respective ionizing potentials. When the current ceases altogether, the gases drift by virtue of their respective momenta into the condensing chamber.

The feeding apparatus is timed so that after a certain interval when the events of the above cycle are complete, a new charge is forced into place between the electrodes, and the cycle repeats.

From the foregoing, it should be understood that under my method I contemplate the reduction of metallic ores generally, and in the apparatus illustrated, the metallic ore mixture or compound to be reduced is preferably ground or granulated and mixed with ground coke or carbon, and placed in the hopper 15, and the mechanism driving the hopper feed screw is started.

The charge is gradually forced upward through the connecting pipe and the hollow stud 16 on to the upper surface of the lower electrode 10, where it forms a cone shape, whose sides form angles of repose of about 45 degrees with the surface of the electrode. The upper electrode 9 is about ⅝ inch above the lower, and as the charge is forced upward, its upward point will touch the upper electrode. If the charge is still further pushed upward, it will flatten against the upper electrode and the sides of the cone will spread out.

If this process is continued until the top surface of the cone frustrum is ¾ inch in diameter, the bottom diameter will be approximately 2 inches and the frustrum will contain a volume of one cubic inch, which I find is a convenient amount of material for one charge.

I prefer to carry on the process in a vacuum which reduces the ultimate pressure and improves the speed and efficiency and, for this purpose, employ a vacuum pump 40 having suitable connection with the interior of the casing by a pipe connection 41. Suitable packing for maintaining air tight conditions is provided; thus, 42 designates rubber or asbestos packing interposed between the base 2 and the casing 3.

While the cone-shaped charge described above has a volume of one cubic inch, its resistance between electrodes is about one third of the resistance of the same charge having dimensions of one inch cube, therefore the current flow through the cone would be three times and the time required to vaporize the charge one third of the figures given above for a one inch cube. In both cases 500 volts is assumed to be applied.

It is possible to use lower or even higher voltages, if desired. 500 volts is a commercial voltage readily obtainable, and is as high as is necessary to accomplish my purpose. Lower voltages, as for instance, 250 or 125, are also commercial voltages, and could be used, depending upon the character of the material to be reduced. With the lower voltage, more time is required to heat the charge and also more heat might be lost by radiation, so that the process becomes slightly more efficient by using a higher voltage. Any of the voltages mentioned, however, can be used successfully.

In the construction of the blow-out magnet, I employ a small number of turns of heavy cable, because the whole current flowing through the charge also passes in series through the blow-out coil. This is done in order to have the magnetic field of the blow-out coil and the flow of current through the electrodes in phase.

Under the conditions described above, proper intensities of the magnetic field will be obtained with approximately four turns in the blow-out coil, and by using soft iron or other highly magnetic material having low reluctance. Under the above conditions, the action of the blow-out magnet and the arc will be automatic, no especial means being necessary for timing the action of the magnetic field with respect to the flow of current through the arc, this action being automatically taken care of by the construction and proportioning of the apparatus.

It will be noted that the only regulation required in the source of electrical energy is to apply and maintain a fixed voltage upon the electrodes. The capacity of the generating plant should be sufficient to maintain this voltage without appreciable reduction until after the current flow is established, has risen to its maximum value, and has been interrupted by the blowout action of the magnet.

The value of the current flow is approximately indicated in the example described above. It will be understood, of course, that with a definite voltage applied to the electrodes, the maximum current value reached would vary somewhat with the character of the ore being reduced.

It is also possible and sometimes desirable to limit the maximum rush of current by means of an external resistance or reactance, or by means of a transformer or generator leaving a drooping voltage characteristic with respect to the current flow. It is further to be understood that my process is equally applicable to direct current, in which case either a series or shunt magnet may be used.

Preliminary to the treatment of the solid material under my method, it is sometimes desirable to dry it or calcine the material to drive off the free or combined water.

It is possible to further control the resistance of the charge by mixing the dry ore with a certain amount of sticky, carbonaceous material such as petroleum pitch, to slightly increase the conductivity of the ore when it fills the interstices between the carbon granules.

I claim:

1. The herein described method of treating metallic ores and the like, which consists in mixing ground material with ground carbon or the like, positioning a charge of the mixture between elongated and divergent electrodes, applying a voltage to the electrodes of sufficient amount to substantially instantly vaporize the charge, applying a magnetic field in phase with the current through the charge and at substantially right angles to it to move the vapors of the charge along the electrodes and in a direction at right angles to both the current and magnetic field, interrupting the current flow by reason of the increasing length of the arc path through the vapors of the charge between the electrodes, and condensing the vapors.

2. The herein described method of treating metallic ores and the like, which consists in feeding charges of the material to be treated between elongated and divergent electrodes, applying a voltage of sufficient amount to the electrodes to substantially instantly vaporize the charge, applying a magnetic field through the vaporized charge whose lines of force are substantially at right angles to the flow of current and of sufficient intensity to move the vapors from between the electrodes to interrupt the current flow, and condensing the vapors.

3. The herein described process of treating metallic ores and the like which consists in subjecting the said ores to an electric arc formed between two electrodes to effect a conversion of the said ores to vapor form, subjecting the arc to a magnetic field whose lines of force are substantially at right angles to the flow of current through the arc and of sufficient intensity to move the vapors from between the electrodes and interrupt the current flow, and then condensing the vapors.

4. The method according to claim 3, wherein the conversion of the material to vapor form and the movement of the vapor is effected in a vacuum.

5. The herein described process of treating metallic ores and the like, which consists in passing the material between electrodes to produce successively a flow of current therebetween, a conversion of the material to vapor form and an electric arc through the produced vapor, subjecting the arc to a magnetic field whose lines of force are substantially at right angles to the flow of current between the electrodes to effect successively a displacement of the vapor and an interruption of the current flow, and then condensing the vapors.

6. The herein described process of treating ground metallic ores and the like mixed with ground carbon, which consists in subjecting the mixture to an electric field to produce successively a flow of current between two electrodes, a conversion of the mixture to a vapor mixture, and an electric arc through the vapor mixture; passing a magnetic field through the said vapor mixture to effect a displacement of the vapor mixture and interrupt the current flow between the electrodes, and then condensing the vapors.

7. The herein described process of treating metallic ores and the like, which consists in forming a mixture of the finely divided material with ground carbon, subjecting the mixture to an electric field between a pair of electrodes to produce successively a current flow, a vapor mixture, and an arc, passing a magnetic field through said vapor mixture transversely to the direction of the field of said arc, interrupting the current flow to the electrodes, and then condensing the vapors.

8. The herein described method of treating metallic ores and the like, which consists in subjecting the material in finely divided form to an electric arc to produce a vapor mixture, passing a magnetic field through said vapor mixture transversely to the direction of the current flow in said arc, interrupting the current flow, and condensing the vapors.

9. The herein described method of treating metallic ores and the like, which consists in subjecting the material in finely divided form to an electric arc to produce a vapor mixture, passing a magnetic field through said vapor mixture transversely to the direction of the current of said arc, interrupting the arc by means of said magnetic field, and condensing the vapors.

THEODORE VARNEY.